United States Patent
Kumra et al.

[11] Patent Number: 6,077,302
[45] Date of Patent: Jun. 20, 2000

[54] SYSTEM AND METHOD FOR ANALYZING AND DESIGNING VIBRATION ISOLATORS

[75] Inventors: Mohinder Kumra, Ann Arbor; Shigong Su, Detroit, both of Mich.

[73] Assignee: EGS, Inc., Dearborn, Mich.

[21] Appl. No.: 09/022,750

[22] Filed: Feb. 12, 1998

[51] Int. Cl.[7] ............................ G06F 17/50; G05B 17/00
[52] U.S. Cl. ........................ 703/7; 703/8; 703/1
[58] Field of Search .................. 395/500.28, 500.29, 395/500.01

[56] References Cited

U.S. PATENT DOCUMENTS

| | | | |
|---|---|---|---|
| 5,163,015 | 11/1992 | Yokota . | |
| 5,297,057 | 3/1994 | Kramer et al. | 395/500.28 |
| 5,410,906 | 5/1995 | Austin et al. . | |
| 5,557,710 | 9/1996 | Amdursky et al. . | |
| 5,576,971 | 11/1996 | Ishii et al. | 395/500.01 |
| 5,625,575 | 4/1997 | Goyal et al. . | |
| 5,677,857 | 10/1997 | Hayashi et al. . | |
| 5,754,447 | 5/1998 | Gardner et al. | 395/500.01 |
| 5,831,875 | 11/1998 | Hirata et al. | 395/500.28 |

OTHER PUBLICATIONS

Belegundu, Ashok D., An Optimization Program Based on the Method of Feasible Directions, NASA Technical Memorandum 4552, 1994, pp. 1–14.

*Primary Examiner*—Kevin J. Teska
*Assistant Examiner*—Kyle J. Choi
*Attorney, Agent, or Firm*—Brooks & Kushman P.C.

[57] ABSTRACT

Damped structures with isolators such as, for example, total vehicles, are analyzed and automatically optimized using a model representing the structure, the model possibly consisting of both rigid and flexible components, together with initial values for isolator design variables, a set of design constraints, and an optimization criterion. Each isolator may have frequency dependent or frequency independent parameters. Excitations may come from a combination of internal and external sources that may be expressed as deterministic or random functions. Finite element modeling is used to determine eigenvectors of flexible finite element components. A total system model is obtained using the rigid component parameters, eigenvectors of flexible components, and spring-damping parameters of isolators. Vibration analysis using the total system model yields system frequency responses and an optimization function. The Method of Feasible Directions is used to produce optimized isolator design variable values based on the optimization function. A graphical user interface assists the user in entering variables, selecting options, and post-processing.

15 Claims, 3 Drawing Sheets

SYSTEM AND METHOD FOR ANALYZING AND DESIGNING VIBRATION ISOLATORS

TECHNICAL FIELD

The present invention relates to total damped system dynamics, vibration analysis, and automatically optimizing parameters for vibration isolators.

BACKGROUND ART

Isolators perform a crucial role in the operation and performance of damped structures such as, for example, motor vehicles. By limiting the transmission of mechanical energy between vehicle components, isolators affect vehicle handling, increase component life by reducing vibrations, and improve the ride performance experienced by vehicle occupants.

Isolators are used in various locations throughout an automotive vehicle, including suspension shock absorbers, engine mounts, body mounts, and exhaust hangers. Tires may also be considered isolators in that they affect how road surface roughness is transmitted to the vehicle body. Hydraulic isolators use a fluid to dissipate mechanical energy. Elastomeric isolators use a resilient solid to dissipate mechanical energy. The stiffness and damping coefficients for an elastomeric isolator tends to be independent of frequency while coefficients for hydraulic isolators tend to be frequency dependent.

Noise, vibration and harshness (NVH) issues are critical to the acceptance of a vehicle by consumers. Isolators are a key component in NVH design. In NVH design, the type, sizing and placement of isolators are important. Vibration analysis of total vehicles requires a large, complex finite element model and long computation time. Therefore, NVH engineers have traditionally depended heavily on test data and results of simple model analysis. Prior design methodologies generally required multiple design-and-test cycles before a satisfactory result was achieved.

One difficulty with current techniques for vehicle isolator design using modeling is the inability to consider all isolators in the system simultaneously. Also, in order to achieve relevant results, all six degrees of freedom must be considered for each isolator.

Another difficulty with current techniques for vehicle isolator design using modeling is the complexity of the vehicle model. One solution in previous techniques is to use quarter or half vehicle models. Partial models are not effective for simulating complex road inputs and do not fully model all isolators. Another solution is to treat each vehicle component as a rigid element. Such models produce approximate solutions that may lack necessary accuracy.

Still another difficulty with current techniques for vehicle isolator design using modeling is the representation of forcing functions. System stimuli may come from external sources, in particular excitation of tires by road surface roughness. For best simulation results, each tire should be capable of providing an independent input. System stimuli may also come from internal sources such as the engine, transmission, and exhaust systems.

A further difficulty with current techniques for vehicle isolator design using modeling is an inability to handle multiple isolator types, such as elastomeric isolators and hydraulic isolators, in the same design application.

A system and method is required for analyzing and determining the design variable values for a plurality of isolators. The ability to utilize a full system model, capable of incorporating rigid and flexible components, is needed. Excitation from multiple external and internal sources should be accommodated. Different types of isolators within the same model should be supported. Design iterations should be processed without human intervention until an optimal design is produced.

SUMMARY OF THE INVENTION

It is a general object of the present invention to analyze and automatically determine optimal design variable values for a plurality of isolators.

Another object of the present invention is to include different types of isolators in a single design problem.

Still another object of the present invention is to use full vehicle models with both rigid and flexible components in the design of vehicle isolator systems.

A further object of the present invention is to accept multiple independent internal and external excitation sources.

A still further object of the present invention is to achieve a better overall design of isolator systems.

Yet a further object of the present invention is to reduce the time and cost of designing isolator systems.

Yet a still further object of the present invention is to reduce the computation complexity for analyzing and designing isolators so that a total system is with multiple subcomponents can be designed on a personal computer or a workstation.

In carrying out the above objects and other objects and features of the present invention, a method is provided for analyzing vibrations and automatically optimizing the design variable values describing at least one isolator in a damped structure, the damped structure being comprised of at least one component, the method including classifying each component as either rigid or flexible; developing a finite element model representing flexible components of the structure; entering parameters describing each rigid component; entering initial values for isolator design variables, a set of design constraints, and an optimization criterion; determining eigenvectors of flexible components using the finite element model; determining a total system model using the eigenvectors of flexible components and parameters of rigid components; performing vibration analysis on the total system model; determining an optimization function using the optimization criterion and the results of vibration analysis; determining optimized design variable values using the optimization function and the set of design constraints; repeating the steps of determining a total system model, performing vibration analysis, determining an optimization function, and optimizing design variable values until the optimization function is minimized; and generating output data corresponding to the optimized design variable values.

In one embodiment the method of the present invention further includes determining that only vibration analysis is to be performed based on user input; bypassing determining an optimization function, bypassing determining optimized design variable values, and bypassing repeating the steps of determining a total system model, performing vibration analysis determining an optimization function, and optimizing design variable values until the optimization function is minimized if it is determined that only analysis is to be performed; and generating output data corresponding to the results of vibration analysis.

In another embodiment of the present invention, the method further includes post processing the generated output data to produce graphical representations of the optimized design variables.

In still another embodiment of the present invention, the method further includes specifying the isolator mounting system for each isolator, and specifying excitation parameters.

In yet another embodiment of the present invention, the method further allows each isolator to be described using either frequency dependent or frequency independent variables.

In a further embodiment of the present invention, the method of the present invention permits forming at least one group containing at least one flexible component, selecting a group to be contracted, and contracting eigenvectors on the at least one component in the selected group without considering any flexible components not included in the selected group.

In a preferred embodiment of the present invention, all of the above embodiments are included.

A system is also provided in accordance with the present invention for analyzing and automatically optimizing the design variable values describing at least one isolator in a damped structure. The system includes a data input means, a data display means, a storage system, and a processor. The processor includes a graphical user interface module operative to allow a user to determine a finite element model representing flexible components, to specify parameters of rigid components, to specify a set of design constraints, to specify initial values for design variables, and to specify an optimization criterion; a total model development module operative to determine a set of governing equations for the damped structure using eigenvectors of the selected finite element model, parameters of rigid components, and, for the first pass through the vibration analysis module, initial design variable values, otherwise, locally optimized design variable values; a vibration analysis module operative to produce frequency responses for components of the damped structure; and a optimization module operative to develop locally optimized isolator design variable values based on frequency responses, design criterion and the design constraints, and determine globally optimized design variable values as the locally optimized design variable values if the optimization function is minimized with the locally minimized design variable values.

A computer readable storage medium having information stored thereon representing instructions executable by a computer for the purpose of analyzing vibrations and automatically optimizing the design variable values describing at least one isolator in a damped structure is also described. The storage medium includes instructions for entering parameters describing each rigid component; instructions for entering initial values describing isolator design variables, a set of design constraints, and an optimization criterion; instructions for determining eigenvectors of flexible components using the finite element model; instructions for determining a total system model using the eigenvectors of flexible components and parameters of rigid components; instructions for performing vibration analysis on the total system model; instructions for determining an optimization function using the optimization criterion and the results of vibration analysis; instructions for determining optimized design variable values using the optimization function and the set of design constraints; instructions for repeating the steps of determining a total system model, performing vibration analysis, determining an optimization function, and optimizing design variable values until the optimization function is minimized; and instructions for generating output data corresponding to the optimized design variable values.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
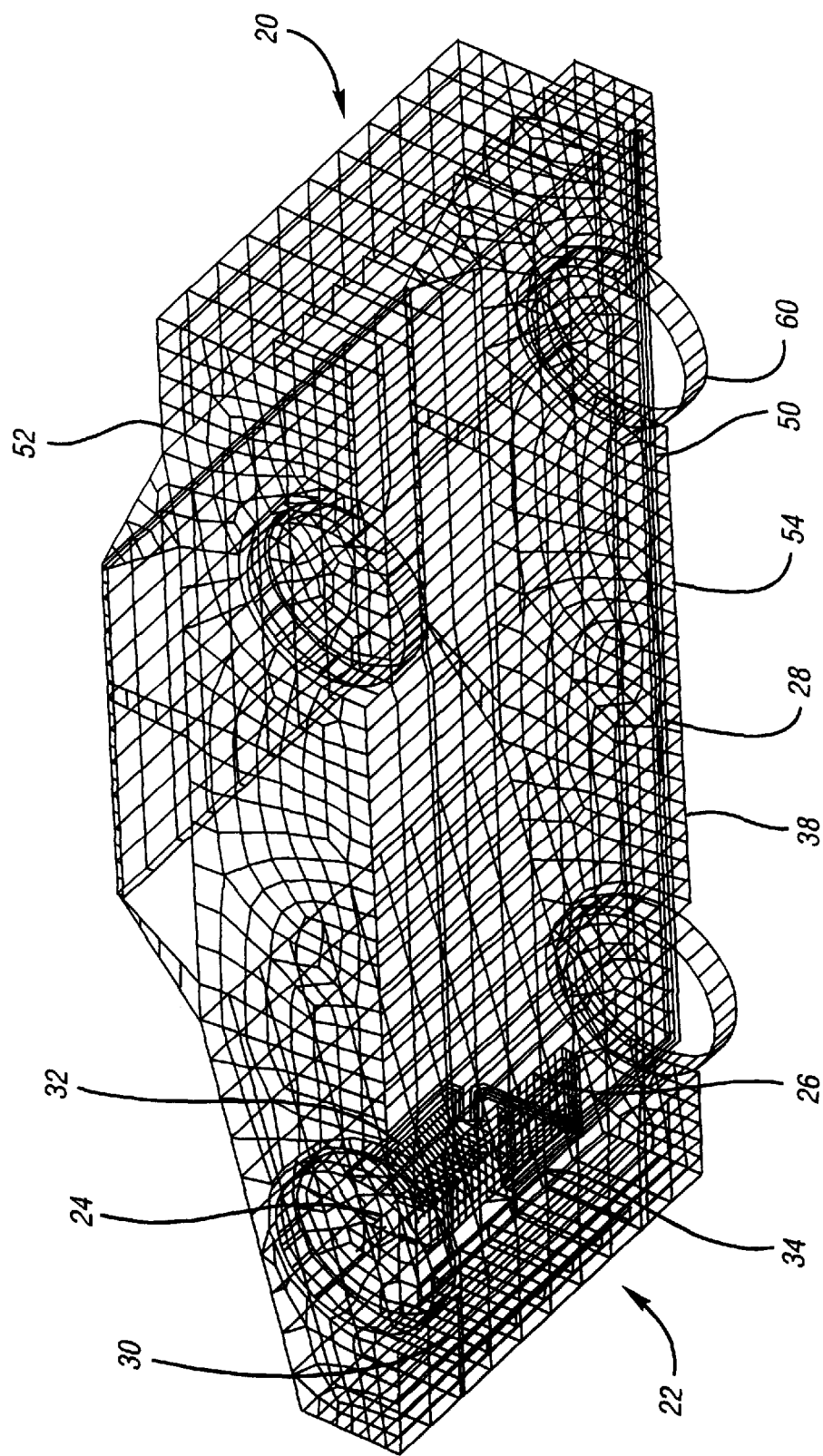
FIG. 1 is a diagram of an automotive vehicle and typical isolators.

Referring now to FIG. 1, a diagram of an automotive vehicle and typical isolators is shown. Vehicle 20 is propelled by a power train, shown generally by 22. Powertrain 22 includes engine 24, transmission 26, exhaust system 28, and axles 30. Powertrain 22 is mechanically buffered from the remainder of vehicle 20 through isolators, shown generally as 32. Engine 24 is isolated through engine mounts 34. Exhaust system 28 is isolated through hangers 38. Vehicle 20 may have body mounts 50 to mechanically isolate body 52 from frame 54.

Each of tires 60 connects through a wheel to axle 30 and through a suspension system not shown. This assembly serves to isolate vehicle 20 from vibrations introduced by road surface roughness.

Figure 2:
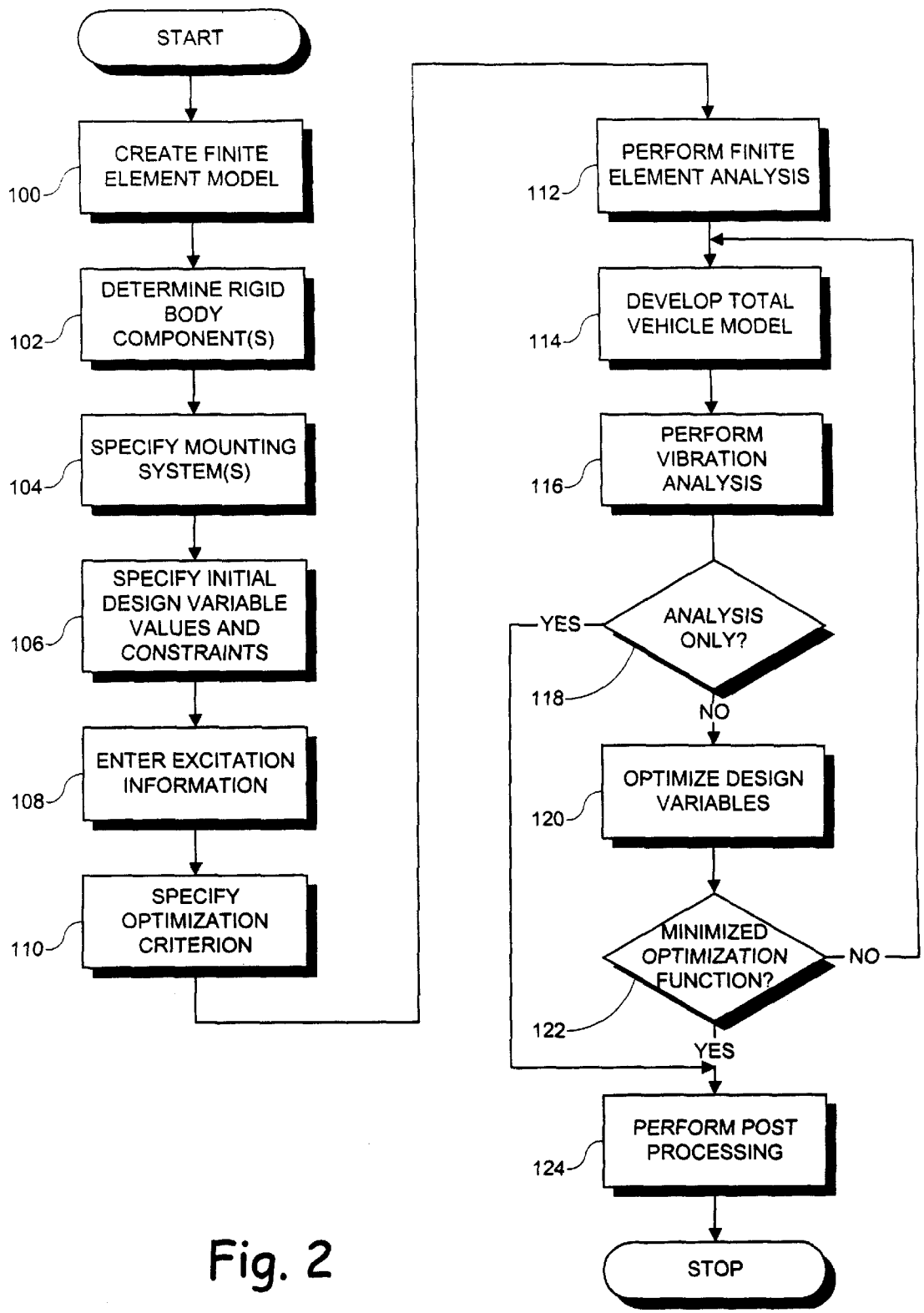
FIG. 2 is a flow diagram of an embodiment of the present invention.

Referring now to FIG. 2, a flow diagram of an embodiment of the present invention is shown. As will be appreciated by one of ordinary skill in the art, the operations illustrated in the flow diagrams are not necessarily sequential operations. The order of steps may be modified within the spirit and scope of the present invention. The present invention transcends any particular implementation and the embodiment is shown in sequential flow chart form for ease of illustration.

A finite element model is created in block 100. Flexible components of vehicle 20 are represented by a finite element model. In a preferred embodiment, a NASTRAN format is used to express the model. Any suitable editor may be used to construct the model.

Rigid body components are determined in block 102. The present invention allows vehicle 20 to be modeled as a rigid body, as a flexible body, or with some components classified as rigid and some as flexible. Generally, a component is considered as a flexible structure if its natural frequencies lie within or close to the range of frequencies to be considered. Each rigid component can move with six degrees of freedom (three translational and three rotational). Each flexible component can move with six degrees of freedom and deflect according to resonant modes. Parameters describing rigid components are entered by the user. In a preferred embodiment, components can be designated as rigid or flexible and rigid component parameters can be entered through a graphical user interface.

Mounting systems are specified in block 104. Each isolator has a mounting system that describes how isolator 32 will attach to vehicle 20. In a preferred embodiment, mounting systems can be specified through a graphical user interface.

Initial design variable values and design variable constraints are specified in block 106. One purpose of the present invention is to optimize isolator mount locations, stiffness coefficients, and damping coefficients. Stiffness and damping for hydraulic isolators may be frequency dependent and, hence, arrays of coefficients as a function of frequency are desired. Initial values for isolator design variables are entered. Often, experience can be used to supply initial design values reasonably close to the resulting optimized values. These initial values may reduce the computation time. However, the present invention is capable of obtaining a correct solution even if initial values are infeasible. Design variable constraints may also be entered. Constraints may be expressed as maximum and minimum allowed values. In a preferred embodiment, initial design variable values and design variable constraints are specified through a graphical user interface.

Excitation information is entered in block 108. In a preferred embodiment, excitation information can be specified through a graphical user interface. Excitations may be expressed as either force or displacement; may be expressed as deterministic functions, random functions in time, or random functions in frequency; and may come from internal or external sources. Each force and displacement excitation is treated as a vector with six degrees of freedom. Interior excitation sources include engine 24, transmission 26, exhaust system 28, and the like.

Exterior excitation sources include interaction between tires 60 and the road. Often, random analysis is useful for evaluating the frequency responses of total vehicle vibration due to tire-road interaction. The excitation of vehicle 20 from tires 60 is assumed to be the apparent vertical roadway motions caused by the forward progress of vehicle 20 along a road having an irregular profile. The road surface irregularities may be treated as a zero mean stationary Gaussian random process and characterized by the single-sided power spectral density (PSD) of the form shown in Equation (1).

$$s(v) = s_0(v_0)\left(\frac{v_0}{v}\right)^r \quad (1)$$

where $v$ is the wavenumber and $s_0(v_0)$ is the roughness coefficient at the wavenumber cutoff $v_0$. The exponent $r$ has a value of about 2.0 if $v<v_0$ and a value of about 1.5 if $v \geq v_0$. A vehicle traveling at a constant forward speed V sees an input of the form shown in Equation (2).

$$s_q(\omega) = s_{q0}(\omega_0)\left(\frac{\omega_0}{\omega}\right)^r \quad (2)$$

where $\omega = v/2\pi V$ and $s_{q0}(\omega_0) = s_0(v_0)/(2\pi V)$.

The power spectral density of other excitations may also be included. These additional excitations may or may not be cross-correlated with road excitations.

Referring again to FIG. 2, the optimization criterion is specified in block 110. Design variables will be optimized using an optimization function. The type of optimization function is specified by the optimization criterion. Types of optimization criterion include, but are not limited to, minimizing the total kinetic energy, minimizing the kinetic energy of the body, and ride comfort as obtained by minimizing average acceleration power at a particular point. Optimization functions are discussed with regards to block 116 below. In a preferred embodiment, the optimization criterion can be specified through a graphical user interface.

Finite element analysis is performed in block 112. In the preferred embodiment, NASTRAN is used to perform finite element analysis and for eigenvector contraction. The eigenvector contraction may be carried out for each flexible component separately or for a grouping of flexible components. The outputs of this analysis are the eigenvectors of flexible components in the finite element model.

The total vehicle model is developed in block 114. A set of governing equations is developed using the eigenvectors of flexible components, specifications for rigid body components, mounting system descriptions, excitation parameters, and, for the first pass, initial design variable values. For subsequent passes, the initial design variable values are replaced with locally optimized design variables developed as described with regards to block 120 below.

Hamilton's Principle and Lagrange's equation are employed as a starting point for deriving the governing equations of total vehicle vibrations as in Equation (3)

$$\delta \int_{t_1}^{t_2} (T - V + W) dt + \int_{t_1}^{t_2} \delta D dt = 0 \quad (3)$$

where T, V, and W are the kinetic energy, potential energy, and the work done by conservative excitations of the total system respectively, and $\delta D$ is the virtual work of the nonconservative forces done from time $t_1$ to time $t_2$.

For rigid and flexible structures, the kinetic energy, dissipation function and potential energy can be expressed as $$T = 0.5 \sum_n \int \dot{u}^t(x)\rho(x)\dot{u}(x) dx \quad (4)$$

$$D = 0.5 \sum_n \int \dot{u}^t(x) c_n(x) \dot{u}(x) dx$$

$$V = 0.5 \sum_n \int e^t(x) k_n(x) e(x) dx$$

where x is the coordinates of each particle in component n, u(x) is the displacement distribution at point x, e is the strain distribution of flexible body deflection, $\rho$ is the mass density, and $c_n$ and $k_n$ are the damping matrix and matrix of elastic parameters for component n respectively. The superscript t indicates the transpose of the matrix or the vector. A single dot over a variable indicates a first order differentiation with respect to time and two dots indicate a second order differentiation with respect to time.

The displacement contribution u(x) and the generalized displacement of component n, $\xi_n$, which may include six degree of freedom for a rigid component and the generalized coordinates of vibration modes for a flexible component, have the relationship shown in Equation (5)

$$u(x) = Gn(x)\xi_n,$$

$$G_n(x) = [H_n(x), L_n(x)\Phi_n(x)] \quad (5)$$

where $H_n(x)$ is the transmission matrix of displacement with respect to generalized displacement, $L_n(x)$ is the transmission matrix of displacement with respect to the eigenvectors, and $\Phi_n(x)$ is the matrix of eigenvectors for a flexible structure. If component n is considered a rigid body, $\Phi_n(x)$ is equal to zero.

For a spring-damping subsystem, kinetic energy is free when the mass can be neglected. The dissipation and potential energy functions are then expressed as $$D_j = 0.5 \sum_n \sum_m (-1)^p \xi_n^t C_{jnm} \xi_m \quad (6)$$

$$V_j = 0.5 \sum_n \sum_m (-1)^p \xi_n^t K_{jnm} \xi_m$$

where $K_{jnm}$ and $C_{jnm}$ are the $L_n \times L_m$ dimensional matrices with $L_{n,m}$=6+number of eigenvectors for flexible body n or m respectively, subscript j is the spring-damping subsystem number, n and m are the component numbers on which each end of spring-damping subsystem j is mounted, and p is equal to 0 if m=n, otherwise p is equal to 1.

Interior excitations, exterior excitations, or both may cause total vehicle vibration. The excitations may be time or frequency deterministic functions or random functions.

Interior excitations can be forces and moments of forces from sources including engine 24, transmission 26, exhaust system 28, and the like. The work, $W_{fn}$, done by internal forces is expressed as $$W_{fn} = \xi_n^t G_n^t T A_n \quad (7)$$

where T is the matrix of coordinate transmission and $A_n$ is the 6-degree of freedom force vector (including three components of force and three components of moments).

External excitations may come through tires 60. Tires can be simplified as a mass-spring system. For each tire, numbered m, the work, $W_{dm}$, and the dissipation function, $D_{dm}$, done by the displacement of tire-road interaction are expressed by $$W_{dm} = -\xi_m^t K_m H_m u_r$$

$$D_{dm} = -\xi_m^t C_m H_m \dot{u}_r \quad (8)$$

where $u_r$ is the three dimensional displacement at the point where the tire surface contacts the road. Any component of $u_r$ can be approximated by zero if the component is significantly smaller than other components.

The governing equation of total vehicle vibration is derived from Equation (3) as Equation (9)

$$M\ddot{\xi} + C\dot{\xi} + K\xi = Q + K_{tr} H_{tr} u_r + C_{tr} H_{tr} \dot{u}_r \quad (9)$$

where M, C, and K are the matrices of mass, damping, and stiffness of the total vehicle; $K_{tr}$ and $C_{tr}$ are the tire spring and damping matrices; Q is the general force matrix derived from Equation (7); and $\xi$ is the total displacement matrix. K and C may be functions of frequency if there are certain types of isolators, such as hydraulic isolators, in the total vehicle model. Equation (9) can be solved for forced responses through frequency modal analysis, frequency direct analysis, or transient analysis for deterministic input.

Referring again to FIG. 2, vibration analysis is performed in block 116. The result of this analysis are frequency responses of system components. Frequency responses provide motion of each component as a function of frequency.

The frequency analysis solution of Equation (9) is $$\xi(f) = H(f)[Q(f) + (K_{tr} + ifC_{tr})H_{tr} u_r]$$

$$H(f) = [-f^2 M + ifC + K]^{-1} \quad (10)$$

where f is frequency, i is the square root of $-1$, and $H(f)$ is the frequency dependent transfer function matrix.

For random input excitations from many points, which are partially correlated by the cross-spectral density matrix $S_{FF}(f)$, the solutions of Equation (9) may be expressed in terms of power spectral density (PSD). Denoting the PSD of displacement by $S_{\xi\xi}$, the solution to Equation (9) can be written as $$S_{\xi\xi}(f) = H^t(f) S_{FF}(f) H^*(f) \quad (11)$$

where H* is the complex conjugate of the transfer function matrix H from Equation (10).

Referring again to FIG. 2, the results of vibration analysis may be output directly or may be used to optimize isolator design as shown in block 118. A user of the present invention has the option to perform only analysis or to perform analysis as a part of each design optimization iteration.

If design optimization is to be performed, design variables are optimized in block 120. Design variables may include spring and damping characteristics as well as the location for each isolator 32 in the total vehicle model. Spring and damping characteristics may be functions of frequency for hydraulic isolators. The large number of design variables makes optimization difficult. Furthermore, since the user can input an infeasible initial value for a design variable, the optimization technique must be robust enough to find an optimum solution regardless of starting point if such a solution exists.

Optimization begins by determining a dynamic objective optimization function. Dynamic objective optimization functions are used to optimize design variables depending on a user defined optimization criterion.

One example of an optimization function is the total kinetic energy, $T_{total}$, as shown in Equation (12)

$$T_{total} = \int f^2 \xi^t M \xi df \quad (12)$$

Another optimization function is the kinetic energy of the body, $T_{body}$, as shown in Equation (13)

$$T_{body} = \int f^2 \xi_{body}^t M \xi_{body} df \quad (13)$$

Still another optimization function is the ride comfort performance described by the expected value of the square of the acceleration at a point rc where ride comfort is measured, as shown in Equation (14)

$$E\{\xi_{rc}^2\} = \int f^4 \xi_{rc}^t(f) \xi_{rc}(f) w(f) df \quad (14)$$

where w(f) is the weighting function of frequency. The ride comfort performance for random excitations is shown in Equation (15)

$$E\{\xi_{rc}^2\} = \int f^4 \sum_{ij} |S_{\xi_i \xi_j}(f)| w(f) df \quad (15)$$

Yet another optimization function is the expected value of the total vehicle random kinetic energy as $$E\{T_{total}\} = \sum_n E\{\xi_n^t M_n \xi_n\} \quad (16)$$

$$= \sum_n \int f^2 \sum_{ij} M_{nij} |S_{\xi_i \xi_j}(f)| df$$

These formulations can also be the optimization function of vehicle riding comfort if the matrix $M_n$ is set up with relevant values. In the same way, the potential energy of a mount can be used to measure the deflection. Other optimization functions such as total potential energy, energy transmitted from engine 24, energy transmitted from tires 60, potential energy of the suspension system, potential energy of engine mounts 34, or the like may be specified by the user.

Once the optimization function is determined, design variables can be optimized. The present invention uses the Method of Feasible Directions to optimize design variables. The basic steps in the method involve solving a quadratic program (QP) to find the direction vector and then finding the step size along this direction by performing a constrained one-dimensional line search.

The optimization problem is to minimize the optimization function, expressed generally as F(DV), of a vector of design variables, DV. The optimization is subject to a set of constraint functions, $G_j$(DV), $$G_j(DV) \leq 0 \; j=1, \ldots, NCON \qquad (17)$$

and subject to design variable constraints, $$DVL_i \leq DV_i \leq DVU_i \; i=1, \ldots, NDV \qquad (18)$$

where NCON is the number of constraints, NDV is the number of design variables, and $DVL_i$ and $DVU_i$ are the lower and upper bounds of the $i^{th}$ design variable, respectively.

The first basic step is to determine a search direction, d, that will both point to a feasible region (is feasible) and reduce the objective function (is usable). If $\nabla F \cdot d < 0$, where $\nabla$ is the gradient operation, the direction is usable. If $\nabla G_j \cdot d < 0$, the direction is feasible. A direction satisfying both feasibility and usability can be found by considering the subproblem of minimizing the artificial variable $\theta$ subject to $$\nabla F \cdot d \leq \theta \qquad (19)$$
$$\nabla G_j \cdot d \leq \beta_j \theta, \qquad j \in J_{EP}$$
$$\frac{1}{2} d^t d \leq 1$$

where $J_{EP}$ is an active set defined as the union of active constraints and active bounds $$J_{EP} = \{j : G_j + EP \geq 0\} \cup \qquad (20)$$
$$\{\text{Active lower and upper bounds}\}$$

and where $\beta_j$ is the push-off factor associated with the $j^{th}$ constraint and EP is the constraint thickness parameter. The push-off factor and thickness parameter will be more fully discussed below.

An alternate notation to the subproblem is $$y = [d, \theta]^t \qquad (21)$$

$$p = [0, \ldots 0, 1]^t$$

$$A^t = \begin{bmatrix} \nabla G_1 & -\beta_1 \\ \nabla G_2 & -\beta_2 \\ \ldots & \ldots \\ \nabla G_{NAC} & -\beta_{NAC} \\ \nabla F & -1 \end{bmatrix}$$

where y and p are NDV+1 length vectors, A is an NAC+1×NDV+1 matrix, and NAC is the total number of active constraints including active bounds. The gradients in (21) are normalized to be unit vectors. The subproblem can now be written as $$\text{Minimize } \frac{1}{2} \mu^t [A^t A] \mu + \mu^t (A^t p) \qquad (22)$$
$$\text{subject to } \mu \geq 0$$

where $\mu$ is an NAC+1 length vector. The subproblem expressed in (22) is a QP problem.

In a preferred embodiment, the linear affine scaling algorithm of Karmarkar's approach is used to solve (22). The initial estimate of variables, $\mu^0$, is set to be greater than zero. The following three step process is repeated until the QP function in Equation (21) has small changes for three consecutive iterations.

The first step in Karmarkar's approach is a transformation to a new set of variables, $\mu^{new}$, as $$\mu = D \mu^{new} \qquad (23)$$

where D is a diagonal matrix with elements equal to the components of $\mu^0$, the current value of $\mu$.

The second step in Karmarkar's approach is to find a search direction s that results in the steepest descent on the new space of variables, as in Equation (24)

$$s = -D(A^t A \mu + A^t p) \qquad (24)$$

A step size in direction s, $\rho$, is obtained using Equation (25)

$$\rho = \min(\rho_1, \rho_2) \qquad (25)$$

where $\rho_1$ is 98% of the maximum distance to the boundary, ensuring that $\mu$ is greater than zero, and $\rho_2$ is the minimum of the quadratic function along s. At the end of the $k^{th}$ iteration, the new variables are defined as $$\mu^{k+1} \mu^k + \rho D s \qquad (26)$$

Once a direction that is usable and feasible is found, a step size $\alpha$ along d is determined. First, an initial step, $\alpha_{init}$, is found as $$\alpha_{init} = \min(\alpha_B, \alpha_F, \alpha_{ML}) \qquad (27)$$

where $\alpha_B$ is the maximum step based on lower and upper limits on DV, $\alpha_F$ is a value of $\alpha$ that reduces the objective by 5%, and $\alpha_{ML}$ is a value of $\alpha$ that results in a 15% maximum change in a design variable. The initial step is used to generate a sequence of steps with each step $\alpha_k$ used to generate a design vector DV($\alpha_k$)

$$DV(\alpha_k) = DV^0 + \alpha_k \cdot d \tag{28}$$

$$(\alpha_k) = \frac{\alpha_{init}}{GR^k} \quad k = 0, 1, \ldots$$

where $DV^0$ is the present feasible point and GR is the golden section ratio of 0.618. After each iteration k, the constraints are checked and, if any constraint has been violated, $DV(\alpha_k)$ and $DV(\alpha_{k+1})$ define an interval containing the zero of the constraint function and $\alpha$ lies between $\alpha_k$ and $\alpha_{k+1}$. A bisection algorithm can be used to find $\alpha$ as is well known in the art.

Once $\alpha$ has been found, the new design variable vector, $DV^1$, is determined as $$DV^1 = DV^0 + \alpha d \tag{29}$$

The present design vector $DV^0$ is set to $DV^1$ and the process of finding d, $\alpha$ and $DV^1$ are repeated.

The push-off factor of Equation (20), $\beta_j$, is defined to be $$\beta_j = \beta_0 \cdot \left(1 + \frac{G_j}{EP}\right)^2 \tag{30}$$

where $\beta_0$ is 1 by default. Push-off factors are set to zero for bounds and linear constraints. Also, if computation of d leads to a useful but not feasible direction for a certain constraint $G_j$, the corresponding push-off factor $\beta_j$ is increased slightly and d recalculated. This is attempted at most five times before EP is adjusted as described in the following paragraph.

The default value for the constraint thickness parameter EP is 0.01. If, after calculation of d, the direction is not usable-feasible, EP is divided by 3 to produce a new EP value. This is attempted at most five times after which the program terminates with the final solution.

The d, $\alpha$, DV iterative calculation process is stopped under any one of the following conditions. First, if the magnitude of d is less than a small threshold. Second, if any absolute change in F is less than a small threshold. Third, if the ratio of the absolute change in F to F is less than a small threshold. Fourth, if successive reductions in EP result in no usable-feasible direction. In any case, the resulting design vector yields an optimal solution.

If, at the start of optimization, $DV^0$ is infeasible, implying that at least one constraint $G_j$ is greater than zero, the constraint violation is first corrected before proceeding with the algorithm described above. In this case, a QP problem similar to Equation (19) is performed, the principal difference being that the objective function minimization is removed resulting in a feasibility only (no usefulness) search. If it is not possible to find a direction vector that satisfies all constraints, the constraint thickness parameter is reduced $$EP^{new} = EP - \frac{1}{2}(EP + G_{max}) \tag{31}$$

and the direction vector recalculated, where $G_{max}$ is the maximum constraint value. If, at the end of five iterations of reducing EP, no feasible direction is found, the method halts indicating that no feasible design can be found.

Referring again to FIG. 2, the optimization function is checked for minimization in block 122. The output of the step to optimize design variables, block 120, represents locally optimized isolator design variables, since the optimization function is based on the vehicle model which is based, in part, on the isolator design variables. Therefore, changing the design variables may result in the locally optimized design variables no longer being optimum for the new vehicle model. The optimization function is therefore examined with the newly produced locally optimized isolator design variables. If the optimization function has not yet been adequately minimized, the steps of developing a total vehicle model, performing vibration analysis, and optimizing design variables are repeated using the results of the last design variable optimization. If the optimization function has been adequately minimized, the globally optimized design variables are determined to be the locally optimized design variables.

Post processing is performed in block 124. Post processing includes manipulating the data, in particular the optimized isolator design parameters, for graphical display. In one embodiment HYPERMESH, a graphical mesh post processor, is used to display images of stress and displacement. Graphing and charting is provided by custom software.

Figure 3:
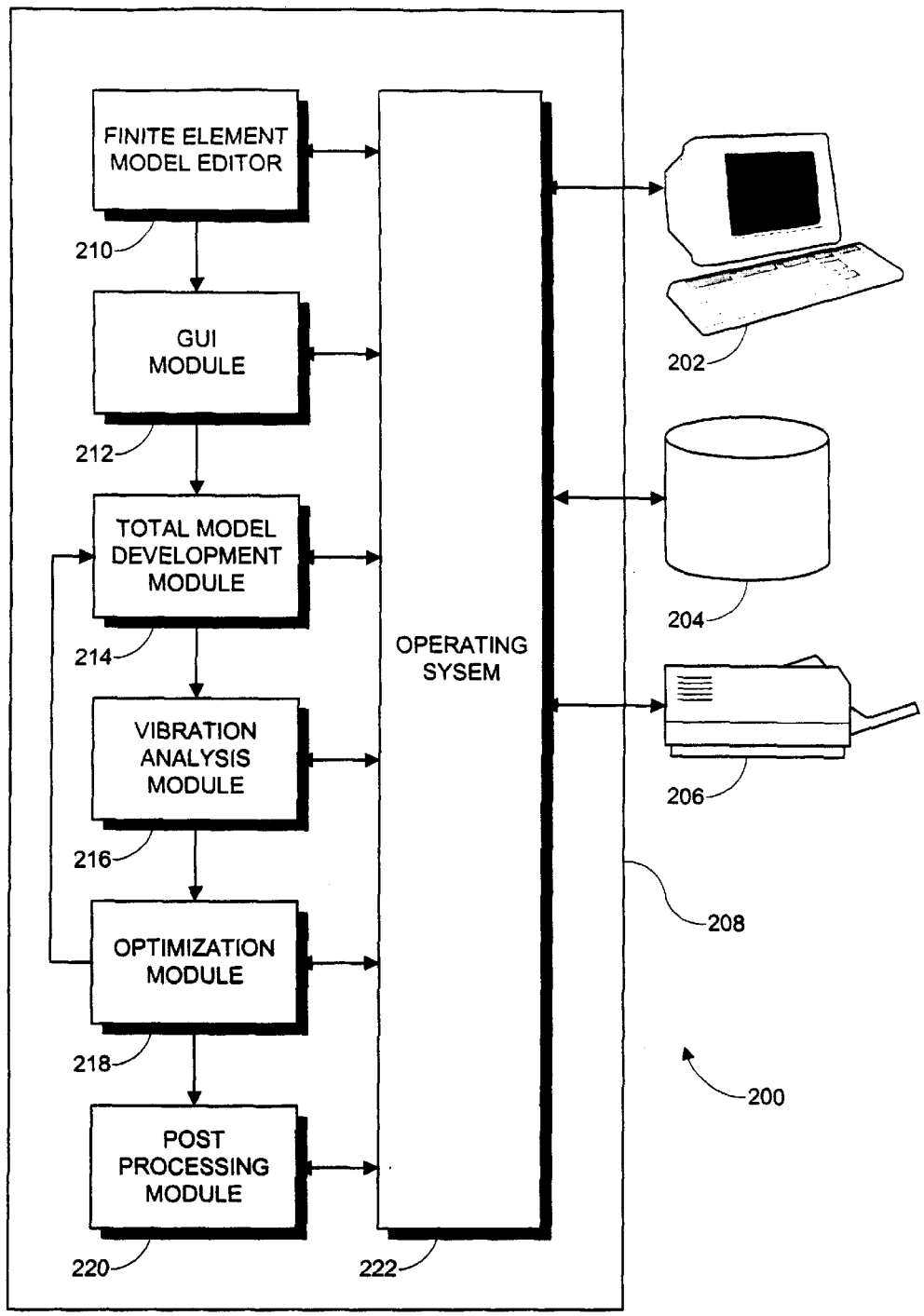
FIG. 3 is a block diagram of a system for implementing the present invention.

Referring now to FIG. 3, a system for accomplishing the present invention is shown. A processing system is shown generally by 200. User interface 202 is operable to allow a user to input information into processing system 200 and receive output from processing system 200. User interface 202 may be a terminal, separate monitor and keyboard, or similar means, and may include pointing devices, digitizing tablets, or other data input or display means as is well known in the art. Storage system 204 is operative to hold data and code, and may be implemented using magnetic, optical, electronic or other technology as is well known in the art. Printer 206 produces paper copies of data. Processor 208 is in communication with user interface 202, storage system 204 and printer 206, and is operative to run code modules to implement and support the present invention. Processing system 200 may include multiple physical processors and may function as a server for multiple users. The specific composition of processor system 200 is not crucial to the present invention.

Processor 208 is operative to run finite element model editor 210, graphical user interface (GUI) module 212, total model development module 214, vibration analysis module 216, optimization module 218, and post processing module 220. Finite element model editor 210 is operative to allow a user to create and modify a finite element model. GUI module 212 is operative to allow a user to specify a finite element model, specify rigid components within the model, describe mounting systems, enter excitation information, initialize design variables, and set other program parameters and options.

Total model development module 214 is operative to determine eigenvectors of flexible finite element model components and to determine governing equations for the total system model using parameters of rigid components, eigenvectors of flexible components, and, for the first pass through total model development module 214, initial design variable values, otherwise, locally optimized design variable values. For multiple flexible components, the contraction of eigenvalues may be carried out on each component separately, independently of other components or may be carried out on a group of components, independently of other flexible components not in the group. The governing equations are based on the contracted eigenvalues.

Vibration analysis module 216 is operative to perform vibration analysis for finding the frequency responses and to determine an optimization function using the optimization criterion and the governing equations.

Optimization module 218 accepts optimization functions and frequency responses and iteratively produces modified design variables until optimization functions are minimized, at which point raw output is produced. In a preferred embodiment, optimization module 218 is operative to determine a search direction; determine a step size along the search direction; determine a new design vector as the current design vector increased by the step size in the search direction; repeat the steps of determining a search direction, determining a step size, and determining a new design vector until locally optimized isolator design variable values are obtained; and determine the globally optimized isolator design variable values as the locally optimized isolator design variable values if the optimization function is minimized with the locally optimized isolator design variable values.

Post processing module 220 accepts raw output and the finite element model and yields graphical representations.

Processor 208 includes operating system 222 which allows finite element model editor 210, graphical user interface 212, total model development module 214, vibration analysis module 216, optimization module 218, and post processing module 220 to interface with user interface 202, storage system 204 and printer 206. Operating system 222 may be a standard operating system such as WINDOWS NT or UNIX.

While the best modes for carrying out the invention has been described in detail, variations are possible within the spirit and scope of the present invention. The best mode described above relates to the design of isolators for a total vehicle. However, any damped structure containing isolators such as, for example, spacecraft, compressor motors, and bridges, may be analyzed and designed using the present invention. Those familiar with the art to which this invention relates will recognize various alternative designs and embodiments for practicing the invention as defined by the following claims.

What is claimed is:

1. A method for analyzing vibrations and automatically optimizing design variable values describing at least one isolator to be used in a damped structure, the damped structure being comprised of at least one component, the method comprising:

classifying each component as either rigid or flexible;

if at least one component is classified as flexible, developing a finite element model representing flexible components of the structure;

if at least one component is classified as rigid, entering parameters describing each rigid component;

entering initial values for isolator design variables, a set of design constraints, and an optimization criterion, the isolator design variables forming a design vector;

determining eigenvectors of flexible components using the finite element model;

determining a total system model using the eigenvectors of flexible components and parameters of rigid components;

performing vibration analysis on the total system model;

determining an optimization function using the optimization criterion and the results of vibration analysis;

determining optimized design variable values using the optimization function and the set of design constraints by determining a search direction, determining a step size along the search direction, determining a new design vector as the current design vector increased by the step size in the search direction, and repeating the steps of determining a search direction, determining a step size, and determining a new design vector until locally optimized design variable values are obtained;

repeating the steps of determining a total system model, performing vibration analysis, determining an optimization function, and optimizing design variable values until the optimization function is minimized; and generating output data corresponding to the optimized design variable values.

2. The method for analyzing vibrations and automatically optimizing the design variable values describing at least one isolator in a damped structure as in claim 1 further comprising:

determining that only analysis is to be performed based on user input;

bypassing determining an optimization function, bypassing determining optimized design variable values, and bypassing repeating the steps of determining a total system model, performing vibration analysis, determining an optimization function, and optimizing design variable values until the optimization function is minimized if it is determined that only analysis is to be performed; and generating output data corresponding to the results of vibration analysis.

3. The method for analyzing vibrations and automatically optimizing the design variable values describing at least one isolator in a damped structure as in claim 1 wherein the system is a motor vehicle.

4. The method for analyzing vibrations and automatically optimizing the design variable values describing at least one isolator in a damped structure as in claim 1 further comprising post processing the generated output data to produce graphical representations of the optimized design variable values.

5. The method for analyzing vibrations and automatically optimizing the design variable values describing at least one isolator in a damped structure as in claim 1 further comprising:

for each isolator, specifying an isolator mounting system; and specifying excitation information.

6. The method for analyzing vibrations and automatically optimizing the design variable values describing at least one isolator in a damped structure as in claim 1, wherein each isolator can be described using either frequency dependent or frequency independent variables.

7. The method for analyzing vibrations and automatically optimizing the design variable values describing at least one isolator in a damped structure as in claim 1, wherein determining eigenvectors of flexible components comprises:

forming at least one group, the at least one group containing at least one flexible component;

selecting a group to be contracted; and contracting eigenvectors for the at least one component in the selected group without considering any flexible components not included in the selected group.

8. The method for analyzing vibrations and automatically optimizing the design variable values describing at least one isolator in a damped structure as in claim 1 wherein classifying each component as either rigid or flexible comprises:

determining at least one natural frequency of each damped structure component; and describing at least one damped structure component as rigid if at least one natural frequency of the component is not substantially within a considered range of frequencies.

9. A system for analyzing and automatically optimizing the design variable values describing at least one isolator in a damped structure, the damped structure comprised of at least one component, the system including a data input means, a data display means, a storage system, and a processor in communication with the data input means, the data display means and the storage system means, the processor comprising:

a graphical user interface module in communication with the data input means, data display means, and storage system, the graphical user interface module operative to allow a user to determine a finite element model representing flexible components, to specify parameters of rigid components, to specify a set of design constraints, to specify initial values for design variables, and to specify an optimization criterion;

a total model development module operative to determine a set of governing equations for the damped structure using eigenvectors of the selected finite element model, parameters of rigid components, and, for the first pass through the vibration analysis module, initial design variable values, otherwise, locally optimized design variable values;

a vibration analysis module operative to produce frequency responses for components of the damped structure; and an optimization module operative to:
(a) develop locally optimized isolator design variable values based on frequency responses, design criterion and the design constraints, the isolator design variable values forming a design vector,
(b) determine a search direction,
(c) determine a step size along the search direction,
(d) determine a new design vector as the current design vector increased by the step size in the search direction,
(e) repeat the steps of determining a search direction, determining a step size, and determining a new design vector until locally optimized isolator design variable values are obtained, and
(f) determine the globally optimized isolator design variable values as the locally optimized isolator design variable values if the optimization function is minimized with the locally optimized isolator design variable values.

10. The system for analyzing and automatically optimizing the design variable values describing at least one isolator in a damped structure as in claim 9, the optimization module further operative to determine if the user has requested analysis only and, if analysis only is requested, to bypass the optimization module.

11. The system for analyzing and automatically optimizing the design variable values describing at least one isolator in a damped structure as in claim 9 wherein the damped structure is a motor vehicle.

12. The system for analyzing and automatically optimizing the design variable values describing at least one isolator in a damped structure as in claim 9, the graphical user interface module further operable to allow a user to describe a mounting system for each isolator and to enter excitation information.

13. The system for analyzing and automatically optimizing the design variable values describing at least one isolator in a damped structure as in claim 9, the system further comprising a post processing module.

14. The system for analyzing and automatically optimizing the design variable values describing at least one isolator in a damped structure as in claim 9, the total model development module further operative to compress the eigenvectors for each flexible component independently of other flexible components; and compress the eigenvectors for a group of flexible components independently of flexible components not in the group.

15. A computer readable storage medium having information stored thereon representing instructions executable by a computer to analyze vibrations and automatically optimize the design variable values describing at least one isolator to be used in a damped structure, the damped structure being comprised of at least one component, each component classifiable as either rigid or flexible, the flexible components modeled as a finite element model, the computer readable storage medium comprising:

instructions for allowing parameters describing each rigid component to be entered;

instructions for allowing initial values describing isolator design variables, a set of design constraints, and an optimization criterion to be entered, the isolator design variables forming a design vector;

instructions for determining eigenvectors of flexible components using the finite element model;

instructions for determining a total system model using the eigenvectors of flexible components and parameters of rigid components;

instructions for performing vibration analysis on the total system model;

instructions for determining an optimization function using the optimization criterion and the results of vibration analysis;

instructions for determining optimized design variable values using the optimization function and the set of design constraints by determining a search direction, determining a step size along the search direction, determining a new design vector as the current design vector increased by the step size in the search direction, and repeating the steps of determining a search direction, determining a step size, and determining a new design vector until locally optimized design variable values are obtained;

instructions for repeating the steps of determining a total system model, performing vibration analysis, determining an optimization function, and optimizing design variable values until the optimization function is minimized; and instructions for generating output data corresponding to the optimized design variable values.

* * * * *